Dec. 14, 1926.
C. P. THOMAS
1,610,718
BALANCING CRANKSHAFTS
Filed May 21, 1923  3 Sheets-Sheet 1
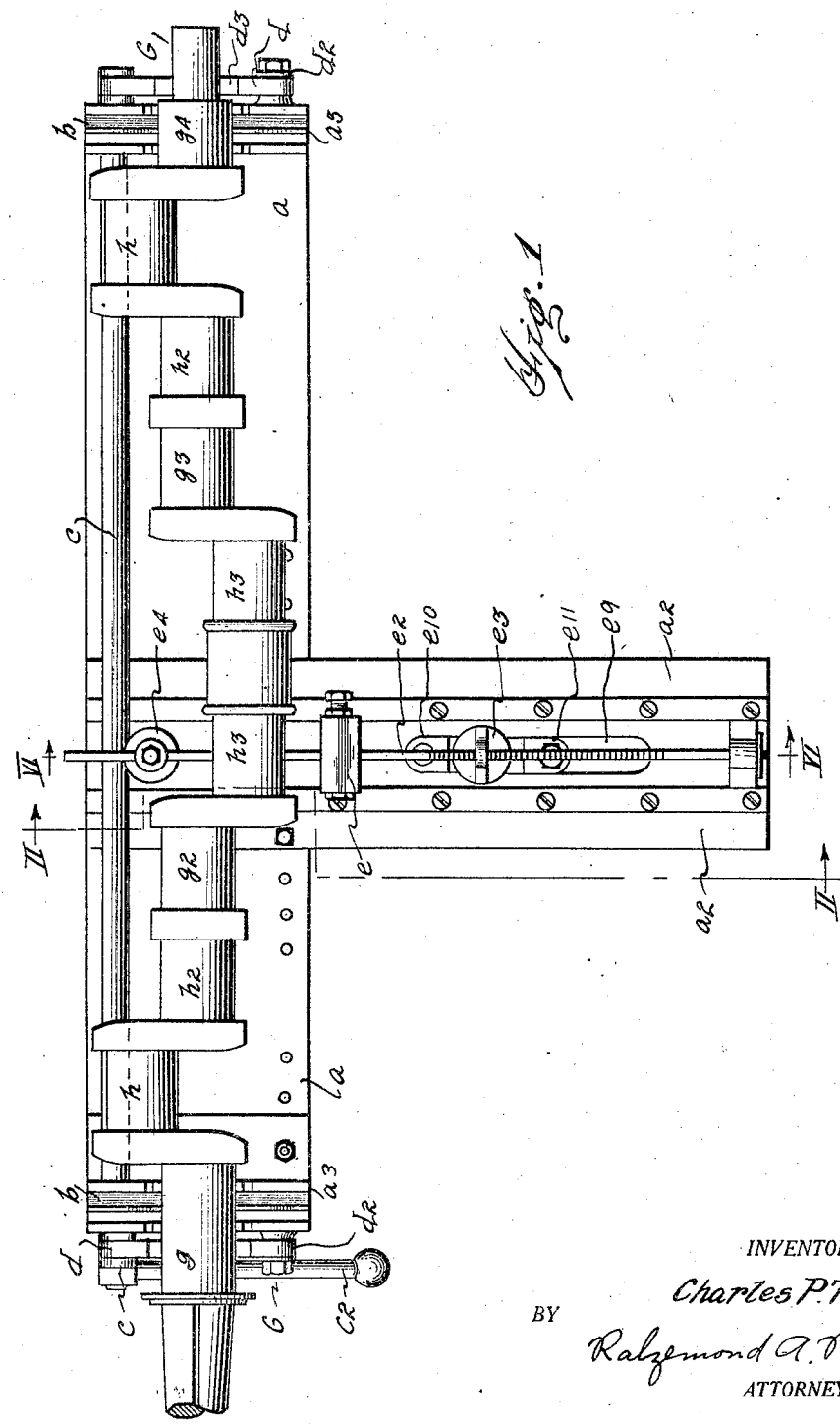
INVENTOR.
Charles P. Thomas
BY
Ralzemond A. Parker
ATTORNEY.

Dec. 14, 1926. 1,610,718
C. P. THOMAS
BALANCING CRANKSHAFTS
Filed May 21, 1923 3 Sheets-Sheet 2

INVENTOR.
BY Charles P. Thomas
Ralzemond A. Parker
ATTORNEY.

Dec. 14, 1926.
C. P. THOMAS
1,610,718
BALANCING CRANKSHAFTS
Filed May 21, 1923   3 Sheets-Sheet 3
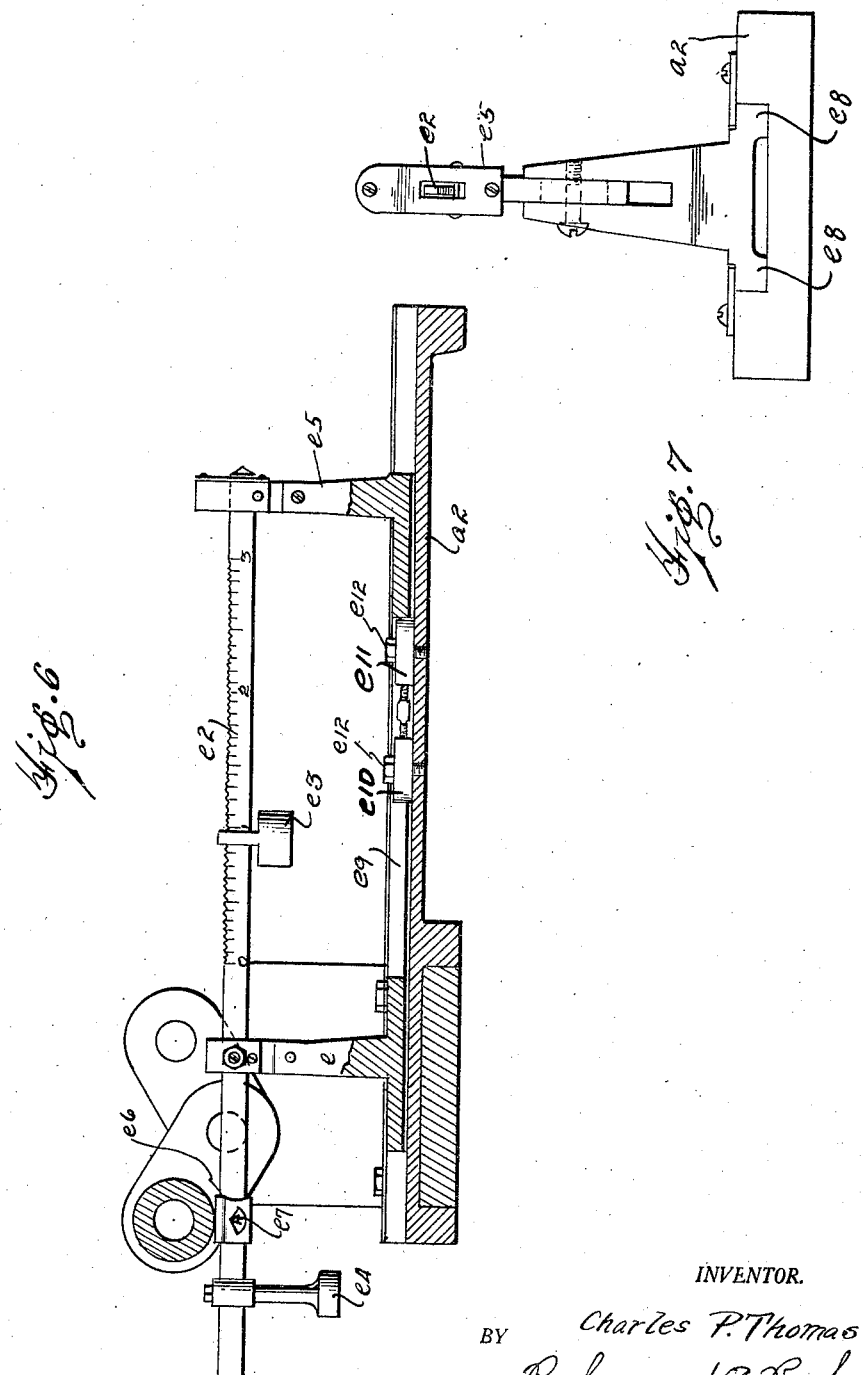
INVENTOR.
Charles P. Thomas
BY
Ralzemond A. Parker
ATTORNEY.

Patented Dec. 14, 1926.

1,610,718

UNITED STATES PATENT OFFICE.

CHARLES P. THOMAS, OF LANSING, MICHIGAN.

BALANCING CRANKSHAFTS.

Application filed May 21, 1923. Serial No. 640,393.

My invention relates to balancing crankshafts for engines and includes a process preliminary to placing the same in a conventional balancing machine.

In the balancing of crankshafts as now practiced the shaft is put into a conventional machine for the purpose and set in rapid rotation and the machine is adjusted first to indicate the static balance of the shafts. The shaft is then taken out and corrected as indicated. It is then placed back readjusted in the machine and again whirled and indicated for the dynamic balance and is then taken out and corrected for this indication.

My invention relates to an apparatus and process of treating the shaft before putting it into the conventional balancing machine so that time is saved and accuracy secured.

In the accompanying drawings,—

Figure 1 is a plan view of an apparatus for performing the process of my invention with a six-cylinder crankshaft in place thereon.

Fig. 6 is a section on the line VI—VI, Fig. 1.

Fig. 7 is an end elevation looking from the right of Fig. 6.

Figure 5:
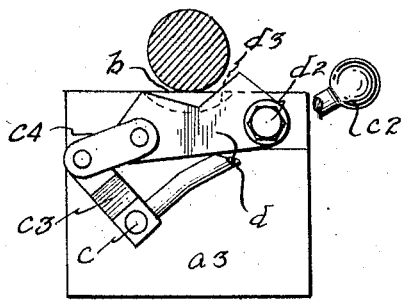
Fig. 5 is a view similar to Fig. 3 showing the crankshaft resting upon the knife edge and free to roll slightly thereon.
Figure 4:
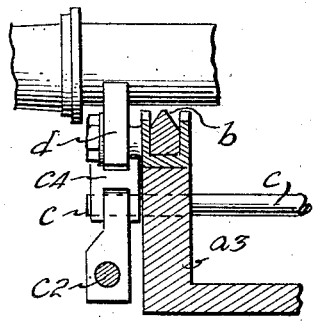
Fig. 4 is a section on the line IV—IV, Fig. 3, looking in the direction of the arrow.
Figure 3:
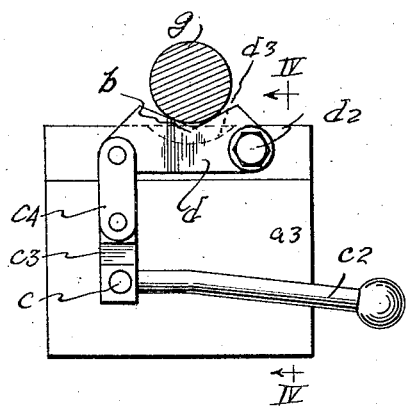
Fig. 3 is a detail end elevation looking from the left of Fig. 1 showing a shaft raised from the knife edge.

$a$ is the base of the supporting frame for the shaft. $a^2$ is a lateral projection from the same at the center thereof as shown in Fig. 1 but capable of sliding along said base while maintaining its relative position extending at approximately right angles to said base $a^3$, $a^3$ are vertical standards rising up from the ends of the base $a$. $b$, $b$ are long knife-edge supports which are secured, by friction or otherwise, in transverse grooves in the tops of the standards $a^3$, $a^3$. $c$ is a rockshaft extending parallel to the edge of the base $a$ and above the same, its ends extending through bearings in the standards $a^3$, $a^3$. $c^2$ is a lever arm or handle by which the shaft $c$ may be rocked. $c^3$ is a radially-extending arm secured on the end of the shaft $c$. The mechanism at one end of the frame is the same as that at the other so that one description will apply to both mechanisms. There is, for instance, an arm $c^3$ on each end of the rockshaft $c$. $d$ is a plate pivoted at $d^2$ having at its center a cut-away portion $d^3$ adapted to receive the end arbor of the shaft. $c^4$ is an arm of a toggle joint, one end of which is pivoted to the free end of the plate $d$ and the other to the free end of the arm $c^3$. When the handle $c^2$ is depressed, as shown in Fig. 3, the plate $d$ at each end of the supporting frame is raised, as shown in Fig. 3, and the shaft is supported above and away from the knife edge $b$. When the handle $c^2$ is raised the plate $d$ is lowered and the shaft is allowed to rest at each end upon the knife edges $b$, $b$, as shown in Fig. 5, in a known and predetermined position.

$e$ is a broad-based standard adapted to be set and remain at any desired position in a wide groove in the lateral extension $a^2$ from the base $a$. $e^2$ is a scale arm pivoted on a knife-edge toward its center to the upper end of the standard $e$. There is a graduation as shown along one arm of the lever $e^2$. $e^3$ is a poise or weight adapted to be adjusted to various positions along the scale upon the lever arm $e^2$. $e^4$ is a long depending counterweight by which the scale lever $e^2$ is balanced about its pivot in the upper end of the standard $e$. $e^5$ is a standard at the outer ends of the lateral projection $a^2$. The end of the scale beam or lever $e^2$ passes into a slot in the standard $e^5$ and is limited in its movement by the ends of said slot or by a transverse rod passing through said standard or otherwise. $e^7$ is a knife-edge pin extending laterally from the scale arm or lever $e^2$ upon the opposite side of its pivot in the standard $e$ from that at which the poise $e^3$ is located. $e^6$ is a saddle resting upon the knife-edge $e^7$. The standards $e$ and $e^5$ are adjustable as to height, as shown in Fig. 7.

$g$, $g^2$, $g^3$, $g^4$ are the arbors of a crankshaft which rest in bearings on the engine when adjusted to postion therein. $h$, $h$ are parallel cranks adjacent to the ends of the crankshaft G. $h^2$ $h^2$ are parallel cranks located symmetrically upon the crankshaft G next to the cranks $h$, $h$ and at 120 degrees to the last-named cranks. $h^3$, $h^3$ are coaxial cranks at the center of the shaft G. The crank pins of the cranks $h^3$, $h^3$ join each other end to end so that only the outer radial arms are required. The cranks $h^3$, $h^3$ are at an angle of 120 degrees to the arms $h^2$, $h^2$, and $h$, $h$ and are so constructed that (before balancing) they shall have a somewhat greater gravitational turning moment about the axis of the shaft than either of the pair of cranks $h$, $h$, or $h^2$, $h^2$.

The position of the standard $e$ is so adjusted that the saddle $e^6$ shall come into position to be engaged by a crank pin of one of the cranks $h^3$, $h^3$ when the crankshaft is placed in position on the frame of the machine, with another pair of cranks as $h^2$, $h^2$, vertically below said axis.

Figure 2:
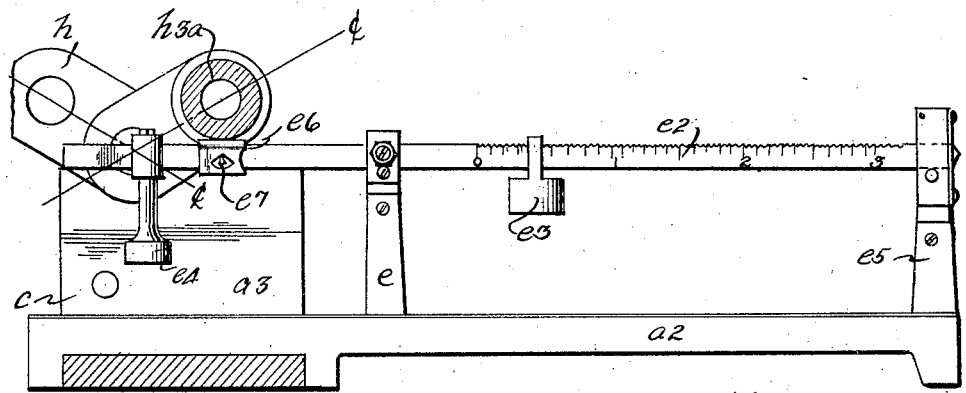
Fig. 2 is a section on the line II—II, Fig. 1, looking in the direction of the arrows.

The adjustment of the apparatus and manner of performing the process is as follows:

The handle $c^2$ is pressed downward, raising the plates $d$, $d$ to the position indicated in Fig. 3. The crankshaft is then placed in position with the arbors $g$, $g$ resting in the notches or cavities $d^3$ of the plates $d$, $d$ and the shaft is turned about its axis until one of the cranks $h^3$, $h^3$ rests on the saddle $e^6$. The handle $c^2$ is then raised, the crank $h^3$ being held firmly on the saddle at the same time by pressure of the hand. This lowers the blocks $d$, $d$, gently and permits the shaft bearings $g$, $g^4$ to rest upon the knife edges $b$, $b$ and in this position the cranks $h^3$, $h^3$ and $h$, $h$ are opposite each other and in the same horizontal plane, the center line of each being 30 degrees above the horizontal. A crank pin of a crank $h^3$ $h^3$ then rests upon the saddle $e^6$ and because of the greater weight of the cranks $h^3$, $h^3$ with reference to the cranks $h$, $h$ the saddle is pressed downward, raising the outer end of the scale arm. The poise $e^3$ is then moved along the scale until the cranks $h^3$, $h^3$ are raised and occupy the same angular position upon one side of the center line of the crankshafts as the cranks $h$, $h$ occupy upon the other side. The scale upon the scale arm is such that it indicates the distance that a certain sized drill will have to be forced in axially to the crank pins of the crank $h^3$ $h^3$ to remove the excess of weight of the cranks $h^3$ over those of the crank $h$. The crankshaft is then taken out of the frame and the drill is forced in, deepening the aperture indicated at $h^3$ $a$, Fig. 2, which operation makes the gravitational turning moment of the pair of cranks $h^3$, $h^3$ equal to that of the cranks $h$, $h$ and leaves that of $h^2$, $h^2$ equally greater than that of either of the other pairs $h^3$, $h^3$ and $h$, $h$. The shaft is then placed in the conventional balancing machine and whirled to indicate amount of static unbalance which amount is to be removed from cranks $h^2$, $h^2$ and in an advantageous position to allow removal of a minimum amount of material at a maximum radial distance from the center of the shaft.

The amount of dynamic unbalance is indicated in the usual way by placing the shaft in the usual way in the conventional balancing machine.

The above mentioned explanation applies when the pair of cranks $h^2$, $h^2$ have a greater gravitational turning moment than the pair $h$, $h$. If the opposite is the case it becomes necessary to make the gravitational turning moment of the pair of cranks $h^3$, $h^3$ equal to that of $h^2$, $h^2$ instead of $h$, $h$. This necessitates weighing the moment of $h^3$, $h^3$ when turned to a position which is 120 degrees from that in the first mentioned case. This can, of course, be done by turning the heavy shaft end for end, which would bring the cranks $h^3$, $h^3$ on the opposite side of a vertical plane through the crank axis from the scale saddle and would require rotation 120 degrees over said axis to get into the scale. I prefer, however, to slide the broad-based standard $e$ under the crankshaft until it brings the saddle $e^6$ in position to receive a pin of crank $h^3$ when rotated over the axis as described. To permit this, the broad base $e^8$ fits under gibs which hold it firmly but permit it to slide freely. In a slot $e^9$ in this base are flared stops $e^{10}$, $e^{11}$ with screw adjustment and clamping bolts $e^{12}$ to fix their positions. Once adjusted these two stops limit the movement of the base $e^8$, one in one direction, the other in the other direction, so the saddle $e^6$ is properly positioned under the crank $h^3$ in either of the two hereinbefore described positions.

To avoid dirt and chips getting against the sliding surfaces the under surface of the broad base of $e$ is cut away, which prevents its motion being impeded by small obstacles. For use with cranks of shorter throw the stops can be adjusted closer together and the height of the standards $e$ and $e^5$ adjusted lower. A reverse adjustment will fit the device for cranks of longer throw.

The advantages of my invention become more apparent when it is remembered that the conventional whirling machine indicates the angular direction from the shaft axis of the excess weight but does not indicate accurately the amount to be taken off each of the adjacent cranks when this direction falls between, as it commonly does. It is, therefore, necessary to correct more or less by guess and test again with further guessing at each correction. With my invention, the weight of one pair of cranks is eliminated by hanging them directly below the crankshaft axis, and by weighing the difference between the other two and removing this difference by drilling along the axis of the heavy one with a known size drill for the distance indicated by the scale (the hole being started before weighing), I balance the two pairs and need only remove metal from one pair after the whirling balance trial. A saving of approximately one-fourth the labor and time results.

If desired, the cranks $h^2$, $h^2$ may be made intermediate in gravitational turning moment between cranks $h$, $h$ and cranks $h^3$, $h^3$ and the cranks $h^2$, $h^2$ may be weighed as above described against the cranks $h$, $h$ and corrected according to indications, the base $e^8$ with the parts thereon being adjusted to the required position along the base $a$.

The scale beam $e^2$ may be adjusted to different heights, as above described, to adjust it to different crank shafts.

What I claim is:

1. The method of preparing a crankshaft having end cranks, center cranks and intermediate cranks, consisting in making the center cranks of a greater turning movement due to their weights than the end cranks, placing said crankshaft in a horizontal position so that it may rotate, arranging the end cranks and the center cranks at equal angular positions to the horizontal and on opposite sides of the vertical plane through the axis of the crankshaft with the intermediate cranks vertical, measuring a preponderance of rotating effect of the center cranks, and removing material therefrom to remove said excess of turning moment.

2. In an apparatus of the kind described, two standards provided with bearings for a multiple crankshaft, a scale beam adjacent to said standards, said scale beam being so located with reference to said bearings that one of the cranks of said shaft shall engage upon said scale beam at its proper angle, for the purpose described, said bearings consisting of prepared knife-edges as shown and described, plates having notches in their upper edges located adjacent to each of said knife-edges, means for raising said plates up so as to receive the arbors of said crankshaft before they engage said knife-edges, and means for lowering said plates to allow said arbors to rest on said knife-edges.

3. In an apparatus of the kind described, the combination of two standards provided with bearings adapted to receive a multiple-crank-shaft and permit it to rotate freely, and a scale beam located in position to have one of the cranks engage thereon at its proper position for the purpose described, said scale beam being adjustable to different sides of the vertical plane through the axis of the crank shaft.

4. The method of preparing a crankshaft having end cranks, center cranks and intermediate cranks, for a balancing machine, consisting in making the pairs of parallel cranks of different turning moments due to their weights with the center cranks having the greater turning moment, placing said crankshaft in a horizontal position so that it may rotate, arranging the pair of cranks having the least gravitational turning moment and the center cranks at equal angular positions to the horizontal and on opposite sides of the vertical plane through the axis of the crankshaft with the other pair of cranks vertical, measuring a preponderance of rotating effect of the center cranks and removing material therefrom to remove said excess of turning moment.

5. The method of preparing a crankshaft having end cranks, center cranks and intermediate cranks, for balancing in a balancing machine, consisting in making the center cranks of a greater turning moment due to its weight than the intermediate cranks and the intermediate cranks of greater turning moment due to their weight than the end cranks, placing said crankshaft in a horizontal position so that it may rotate, arranging the end cranks and the center cranks at equal angular positions to the horizontal and on opposite sides to the vertical plane of the axis of the crankshaft with the intermediate cranks vertical, measuring a preponderance of rotating effect of the center cranks and removing material therefrom to remove said excess of turning moment.

6. In an apparatus of the kind described, the combination of two standards provided with bearings adapted to receive a multiple-crank-shaft and permit it to rotate freely, and a scale beam located in position to have one of the cranks engage thereon at its proper position for the purpose described, said scale beam being provided with a scale thereon graduated to indicate the amount of metal to be removed for the purpose described.

In testimony whereof, I sign this specification.

CHARLES P. THOMAS.